(12) United States Patent
Blondeau

(10) Patent No.: US 10,882,763 B2
(45) Date of Patent: Jan. 5, 2021

(54) ACTIVE MANAGEMENT OF FLUIDIZED BEDS OF ACTIVATED CARBON

(71) Applicant: SAUR, Issy-les-Moulineaux (FR)

(72) Inventor: Sabine Blondeau, Amfreville (FR)

(73) Assignee: SAUR, Issy les Moulineaux (FR)

( * ) Notice: Subject to any disclaimer, the term of this patent is extended or adjusted under 35 U.S.C. 154(b) by 384 days.

(21) Appl. No.: 15/509,315

(22) PCT Filed: Sep. 8, 2015

(86) PCT No.: PCT/EP2015/070520
§ 371 (c)(1),
(2) Date: Mar. 7, 2017

(87) PCT Pub. No.: WO2016/038049
PCT Pub. Date: Mar. 17, 2016

(65) Prior Publication Data
US 2017/0260065 A1    Sep. 14, 2017

(30) Foreign Application Priority Data

Sep. 8, 2014 (FR) ..................... 14 58412

(51) Int. Cl.
*C02F 1/28* (2006.01)
*C02F 1/52* (2006.01)
(Continued)

(52) U.S. Cl.
CPC ............ *C02F 1/283* (2013.01); *C02F 1/5245* (2013.01); *C02F 1/56* (2013.01); *C02F 11/127* (2013.01);
(Continued)

(58) Field of Classification Search
CPC .......... C02F 1/283; C02F 1/24; C02F 1/5245; C02F 1/56; C02F 11/12; C02F 11/127;
(Continued)

(56) References Cited

U.S. PATENT DOCUMENTS 4,659,462 A * 4/1987 Chapman ................ C02F 1/283
                                                        210/202
2006/0000771 A1 * 1/2006 Gaid .......................... C02F 9/00
                                                        210/616

(Continued)

FOREIGN PATENT DOCUMENTS

FR            2946333        12/2010
FR            3005652        11/2014
WO    WO 2014/184371        11/2014

*Primary Examiner* — Matthew O Savage
(74) *Attorney, Agent, or Firm* — Panitch Schwarze Belisario & Nadel LLP

(57) ABSTRACT

The invention relates to a method for treating an aqueous fluid, comprising bringing into contact the aqueous fluid with a fluidised bed of powdered activated carbon, and separating the aqueous fluid from the bed of powdered activated carbon, including a step of managing the fluidised bed of powdered activated carbon. The management step comprises the extraction of a fraction of the fluidised bed of powdered activated carbon in the form of sludge, at least a separation of the sludge extracted in the previous step so as to obtain a fraction having an insoluble index HCl which is higher than that of the sludge before separation by at least 5 percentage points, and a reinjection of said fraction into the fluidised bed of powdered activated carbon.

7 Claims, 3 Drawing Sheets

(51) Int. Cl.
  *C02F 1/56* (2006.01)
  *C02F 11/127* (2019.01)
  *C02F 1/24* (2006.01)
  *C02F 1/00* (2006.01)

(52) U.S. Cl.
  CPC .......... *C02F 1/24* (2013.01); *C02F 2001/007* (2013.01); *C02F 2301/043* (2013.01); *C02F 2301/046* (2013.01); *C02F 2303/16* (2013.01); *C02F 2303/18* (2013.01)

(58) Field of Classification Search
  CPC .......... C02F 2001/007; C02F 2301/043; C02F 2301/046; C02F 2303/16; C02F 2303/18
  See application file for complete search history.

(56) References Cited

U.S. PATENT DOCUMENTS

| | | |
|---|---|---|
| 2012/0080385 A1 | 4/2012 | Perot |
| 2013/0243684 A1 | 9/2013 | Drake |

\* cited by examiner

ACTIVE MANAGEMENT OF FLUIDIZED BEDS OF ACTIVATED CARBON

CROSS-REFERENCE TO RELATED APPLICATIONS

This application is a U.S. National Stage Application pursuant to 35 U.S.C. § 371 of International Patent Application PCT/EP2015/070520, filed on Sep. 8, 2015, and published as WO 2016/038049 on Mar. 17, 2016, which claims priority to French Patent Application 1458412, filed on Sep. 8, 2014, all of which are incorporated herein by reference in their entireties for all purposes.

FIELD OF THE INVENTION

The present invention is related to a method for treating an aqueous fluid, based on powdered activated carbon in the form of a fluidized bed and comprising an active management step of the activated carbon fluidized bed in a manner to ensure constant purification performance at least cost.

BACKGROUND OF THE INVENTION

Methods to treat aqueous fluids using coagulated, and optionally flocculated, fluidized activated carbon (FAC) have the objective of removing organic micropollutants contained in the aqueous fluids such as pesticides, chlorinated solvents, sapid molecules, pharmaceutical products and endocrine disruptors, and of reducing the content of organic matter.

FAC-based methods for treating aqueous fluids can be performed in reactors with a fluidized, coagulated, flocculated carbon bed having up-flow operation (called "FAC reactor"), such as those described in patent FR 2946333 (Carboplus®) or in French patent application N° 1354387 filed on 16 May 2013. Such reactors comprise a single structure in which the contacting of the water to be treated with powdered activated carbon (PAC) and the separation of the treated water from the carbon are both carried out. In some configurations, such as described in patent FR 2946333, the reactors can be equipped with means to inject fresh powdered activated carbon, coagulation and flocculation agents, organized in coordination with the raw water feed circuit so as to define three separate operating zones within the reactor. A first zone arranged in the base of the reactor ensures the inlet and homogenous distribution of raw water in which the coagulation and flocculation agents have previously been injected. This first zone, so-called feed zone, may comprise a lining consisting of a gravel bed surmounted by a sand bed. A second zone, consisting of a fluidized bed of powdered activated carbon surmounts the first zone. The second zone ensures raw water depollution via adsorption. Finally, a third zone, arranged in the top part of the reactor, ensures the separation and recovery of the depolluted water. In other configurations, for example such as described in French patent application N° 1354387 filed on 16 May 2013, these reactors may be devoid of a zone arranged in the base of the reactor. The injection of powdered activated carbon, of aqueous fluid to be treated and of coagulation and flocculation agents is carried out via one same distribution ramp defining two zones within the reactor: a reaction zone and a separation zone.

FAC-based methods to treat aqueous fluids can also be implemented in installations in which each step of the method is performed in a separate structure. For example, coagulated PAC can be contacted with the aqueous fluid to be treated in a first reactor, then separated from the aqueous fluid to be treated by settling in another reactor.

To ensure constant performance levels of treatment, to maintain PAC concentration and constant bed height in the reaction zone of the reactor, powdered activated carbon is generally continuously injected into the reactors and regular carbon purging is carried out. An equilibrium is reached when the settling velocity of the suspension is in line with hydraulic fluidization velocity.

In these reactors, the coagulated PAC, optionally flocculated through polymer addition, is present in the form of carbon flocs, all these flocs forming a sludge. These carbon flocs comprise PAC, metallic hydroxides and colloids as well as various suspended solids. They are generally characterized by a size ranging from a few tenths of a millimeter to a few millimeters and by settling rates ranging from 2 to 20 m/h. The maintaining of these flocs in suspension in settling reactors or in PAC reactors for a given fluid conveying rate is related to the settling rate of the flocs which itself is related to the carbon content of the flocs. The carbon content of the flocs therefore has an impact on the fluidization height of the carbon bed. Also, for a given carbon content in the flocs there is a corresponding maximum concentration of carbon in the reactor.

A reduction in the carbon content of the carbon flocs to below certain thresholds leads to an increase in the height of the carbon bed, even to the entraining of carbon flocs by the aqueous fluid outside the reactor. Separation between the carbon flocs and the aqueous fluid is then no longer effective.

The reduction in the carbon content of the flocs may also lead to de-concentration of the activated carbon bed, particularly in reactors equipped with sludge pits or with a lateral tapping line system having a purge flow rate determined by a fixed bed height. De-concentration of the activated carbon bed leads to lowered performance.

The reduction in the carbon content of carbon flocs may be related to different phenomena e.g. a change in quality of the aqueous flow entering the reactor(s), poor mixing of reagents, e.g. lime, upstream of the reactor and/or insufficient purging of a single fluidization reactor or settling reactor.

The stability of the FAC bed may also be affected by the presence of colloids, metallic hydroxides and suspended solids in excess in the aqueous fluids to be treated. These constituents will be trapped in the fluidized bed of activated carbon and will reduce settling rates of the FAC suspension. Therefore, rapid degradation of the quality of the aqueous flows generates an increase in the height of the fluidization front of the carbon bed and de-concentration thereof.

At the present time, when the stability of the FAC bed and the carbon concentration is no longer ensured for the reasons set forth above, there is only one solution: increasing the renewal of coagulated PAC to renew carbon flocs, and increasing purges to remove carbon-depleted flocs. This technique has the disadvantage of over-dosing PAC in relation to actual purifying needs, this need corresponding to the amount of PAC required to guarantee concentrations of dissolved pollutants, such as pesticides, that are below regulatory concentrations.

These PAC treatment corrections generate extra operating costs, leading in particular to over-consumption of fresh powdered activated carbon.

It is also known in the prior art to apply conventional regenerating operations in situ such as thermal or chemical regeneration, usually for granular activated carbon. These operations are cumbersome to set up on sites such as potable water production plants for example. An installation for this type of method is a very costly solution having regard to the few tens of kilos of activated carbon to be treated, and would generate new waste necessitating additional treatments such as treatment of fumes, treatment of acid (pH<5) or basic (>9) effluent with high desorbed-pollutant content. In addition, these solutions do not bring a rapid solution in parallel with processing in the event of a rapid variation in the quality of the effluent.

There is therefore a need to provide a low-cost method and/or installation to treat aqueous fluids which can overcome the shortcomings of FAC bed behaviour, in particular which can manage/stabilize the fluidization height of the coagulated PAC bed when the quality of incoming water deteriorates, and can concentrate the carbon bed to stabilize or improve removal capacity and to reduce coagulated PAC consumption by concentrating the carbon bed for equivalent purifying performance.

BRIEF DESCRIPTION OF THE INVENTION

The present invention concerns a method for treating an aqueous fluid, comprising the contacting of the aqueous fluid with a fluidized bed of powdered activated carbon, and a separation of the aqueous fluid from the bed of powdered activated carbon, said method for treating being characterized in that it comprises a management step of the fluidized bed of powdered activated carbon, said management step comprising:
  (a) an extraction of a fraction of the fluidized bed of powdered activated carbon in the form of sludge;
  (b) at least one separation of the sludge extracted at step (a) so as to obtain a fraction having an HCl-insoluble value at least 5 percentage points higher than that of the sludge before separation;
  (c) a re-injection of said fraction obtained at step (b) into the fluidized bed of powdered activated carbon.

Advantageously, the fluidized bed of PAC is a fluidized bed of coagulated PAC that is optionally flocculated.

The present invention also concerns an installation for treating aqueous fluids, comprising:
  (a) a powdered activated carbon device for treating aqueous fluids to ensure contacting of the aqueous fluid with a fluidized bed of powdered activated carbon, and separation of the aqueous fluid from the bed of powdered activated carbon;
  (b) means to extract a fraction of the fluidized bed of activated carbon in the form of sludge;
  (c) means to convey the sludge from the extraction point to the sludge separation device;
  (d) at least one sludge separating device;
  (e) means to convey the separated sludge towards the aqueous fluid treatment device.

Advantageously, the fluidized bed of PAC is a fluidized bed of coagulated PAC that is optionally flocculated.

DETAILED DESCRIPTION OF THE INVENTION

Figure 1:
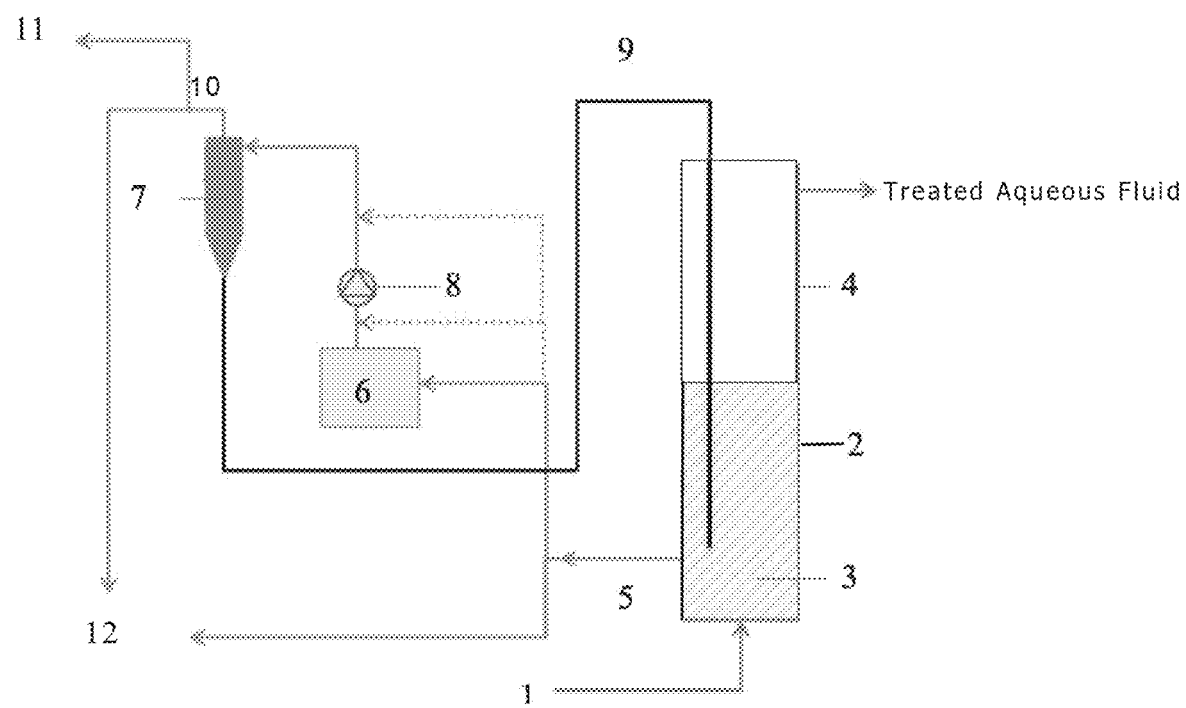
FIG. 1 illustrates one example of an installation according to the present invention allowing implementation of the method of the present invention.

The inventors have developed an aqueous fluid treatment method, based on powdered activated carbon in the form of a fluidized bed, advantageously coagulated and optionally flocculated, comprising a management step of the fluidized bed such as described below. With this step, it is possible in fine to overcome the shortcomings of the powdered activated carbon beds described above.

The term "aqueous fluid(s)" such as used in the description of the present invention designates surface water, underground water, urban or tertiary residual water and/or industrial water.

The expression "powdered activated carbon" such as used in the description of the present invention designates particles of activated carbon having a mean diameter of less than 100 µm. The mean diameter of the particles typically varies from 1 to 99 µm, e.g. 3 to 80 µm or 5 to 45 µm, or 15 to 45 µm. The size of the particles can be determined by laser particle measurement.

The expression "suspended solids" or "SS" such as used in the description of the present invention designates all solid matter obtained after evaporation of the water contained in PAC sludge. It is that portion of the powdered activated carbon bed that is in suspension. SS includes PAC, metallic hydroxides, lime.

The aqueous fluid treatment method of the present invention comprises the contacting of the aqueous fluid with a fluidized bed of powdered activated carbon and separation of the aqueous fluid from the bed of powdered activated carbon. The method of treating therefore allows the removal of organic micropollutants contained in aqueous fluids such as pesticides, chlorinated solvents, sapid molecules, pharmaceutical products and endocrine disruptors, and allows a reduction in the content of organic matter. Advantageously, the aqueous fluids contacted with the fluidized bed of powdered activated carbon are previously treated with coagulation agents and optionally flocculation agents, in particular for water with heavy content of organic matter such as dam water.

Advantageously, the aqueous fluids to be treated are contacted with a suspension of fresh PAC and coagulation agents, and optionally flocculation agents, inside the powdered activated carbon treatment reactor or upstream of the treatment reactor.

The coagulation agents can be selected from among coagulation agents containing iron, aluminium or mixtures thereof, such as ferric chloride, ferric sulfate or aluminium sulfate. Examples of commercial coagulation agents include the products WAC, WAC HB and Aqualenc.

Flocculation agents can be selected from among acrylic flocculation agents, such as anionic and non-ionic polyacrylamides.

The contacting of the aqueous fluid with the fluidized bed of powdered activated carbon and the separation of the aqueous fluid from the bed of powdered activated carbon can be performed in a single structure such as a powdered activated carbon treatment reactor with up-flow operation such as described for example in FR2946333 or in French patent application N° 1354387 filed on 16 May 2013. For example, the treatment reactor with a fluidized bed of powdered activated carbon operating in up-flow may comprise:
  a reaction zone constituted of a fluidized bed of powdered activated carbon extending from the base of the reactor, said reaction zone comprising:

a distribution ramp of the aqueous fluid to be treated, located at the base of the reactor and connected to the line conveying the aqueous fluid to be treated;

a circuit for the injection of reagents such as: fresh PAC, coagulants, flocculants, typically upstream of the distribution ramp of the aqueous fluid to be treated;

an extraction circuit of used activated carbon;

a separation zone surmounting the reaction zone and allowing the separation under gravity of the depolluted aqueous fluid from the powdered activated carbon.

In some embodiments, the contacting of the aqueous fluid with the fluidized bed of powdered activated carbon and the separation of the aqueous fluid from the bed of powdered activated carbon can be carried out in separate structures The method of the present invention is characterized in that it comprises a management step of the fluidized bed of powdered activated carbon. This management step comprises or consists of:

(a) an extraction of a fraction of the fluidized bed of powdered activated carbon, advantageously coagulated and optionally flocculated, in the form of a sludge;

(b) at least one separation of the sludge extracted at step (a) so as to obtain a fraction having an HCl-insoluble value that is higher by at least 5 percentage points, preferably by at least 10 percentage points, than that of the sludge before separation;

(c) a re-injection of said fraction obtained at step (b) into the fluidized bed of powdered activated carbon, advantageously coagulated and optionally flocculated.

Advantageously, the method of the invention allows to:

Manage/stabilize the fluidization height of the coagulated PAC bed when the quality of the aqueous fluid fed into the reactor is deteriorated;

Concentrate the PAC bed to stabilize or improve removal performance;

Reduce PAC consumption by concentrating the carbon bed for equivalent purification performance.

The method is moreover easy to implement.

The HCl-insoluble value allows evaluation of the carbon content in the activated carbon sludge, more specifically in the SS of the activated carbon sludge. This value corresponds to the ratio expressed as a percentage between the weight of a sample of carbon sludge, previously dried at 105° C., subjected to hot hydrochloric acid attack for 20 minutes to the weight of this sample of dried sludge before acid attack. In other words, it is the powdered activated carbon portion contained in the SS of carbon sludge. Hot hydrochloric acid solubilizes the colloids, lime and hydroxides such as iron hydroxides contained in the sludge. The residue obtained after this hot treatment with acid essentially comprises activated carbon which is not solubilized.

When the contacting of the aqueous fluid with the fluidized bed of powdered activated carbon and separation of the aqueous fluid from the powdered activated carbon bed are carried out in a single reactor, the HCl-insoluble value is advantageously higher than 75%, and preferably higher than 80% under optimal operation i.e. CT>90 (CT=SS concentration of the activated carbon bed (g/L)*contact time between the aqueous fluid to be treated and the fluidized bed (FAC)(min)).

When the contacting of the aqueous fluid with the fluidized bed of powdered activated carbon and separation of the aqueous fluid from the powdered activated carbon bed are carried out in separate structures, the HCl-insoluble value is advantageously higher than 55%, and preferably higher than 60% under optimal operation, optimal operation being such as described above.

The fraction having an HCl-insoluble value higher by at least 5 percentage points than that of the sludge before separation, as obtained at step (b) of the method, typically has a SS concentration that is at least twice higher than the SS concentration of the sludge before separation. The SS concentration is determined in accordance with the protocol described in the "Examples" section.

The method of the present invention comprises at least one separation step of the extracted sludge. Each separation step leads to obtaining two fractions.

It is to be understood that the method of the present invention may comprise a single separation step for the direct obtaining of a fraction having an HCl-insoluble value that is higher by at least 5 percentage points than that of the sludge before separation. The second fraction obtained has a SS concentration equal to or less than the SS concentration of the sludge before separation, typically at least 1.5 times less than that of the sludge before separation. The SS concentration is determined following the protocol described in the "Examples" section. The second fraction can be treated by clarification or flotation upstream of the treatment reactor or treated by a separate sludge treatment processing channel.

FIG. 1 schematically illustrates an example of an installation according to the present invention allowing implementation of the method of the present invention. The aqueous fluid to be treated (1), previously contacted with powdered activated carbon, coagulation agents and optionally flocculation agents, is fed into the lower part of a treatment reactor (2) with fluidized bed of powdered activated carbon operating in up-flow and comprising a reaction zone (3) constituted of a fluidized bed of powdered activated carbon extending from the base of the reactor, and a separation zone (4) surmounting the reaction zone allowing separation under gravity of the depolluted aqueous fluid from the powdered activated carbon. Carbon sludge (5) is extracted from the lower part of the reactor and can be directed towards a buffer tank (6) and then towards a hydrocyclone (7) by means of a pumping system (8) or directly towards the hydrocyclone (7) by means of the pumping system (8). After separation inside the hydrocyclone, the fraction (9) of sludge having an HCl-insoluble value higher by at least 5 percentage points than the sludge before separation is re-fed into the reactor. The other fraction (10) can be redirected upstream of the aqueous fluid treatment system (11) or removed (12).

However, in some embodiments, it may be necessary to conduct several separation steps in series to obtain a fraction having an HCl-insoluble value higher by at least 5 percentage points that that of the sludge before separation.

Figure 3:
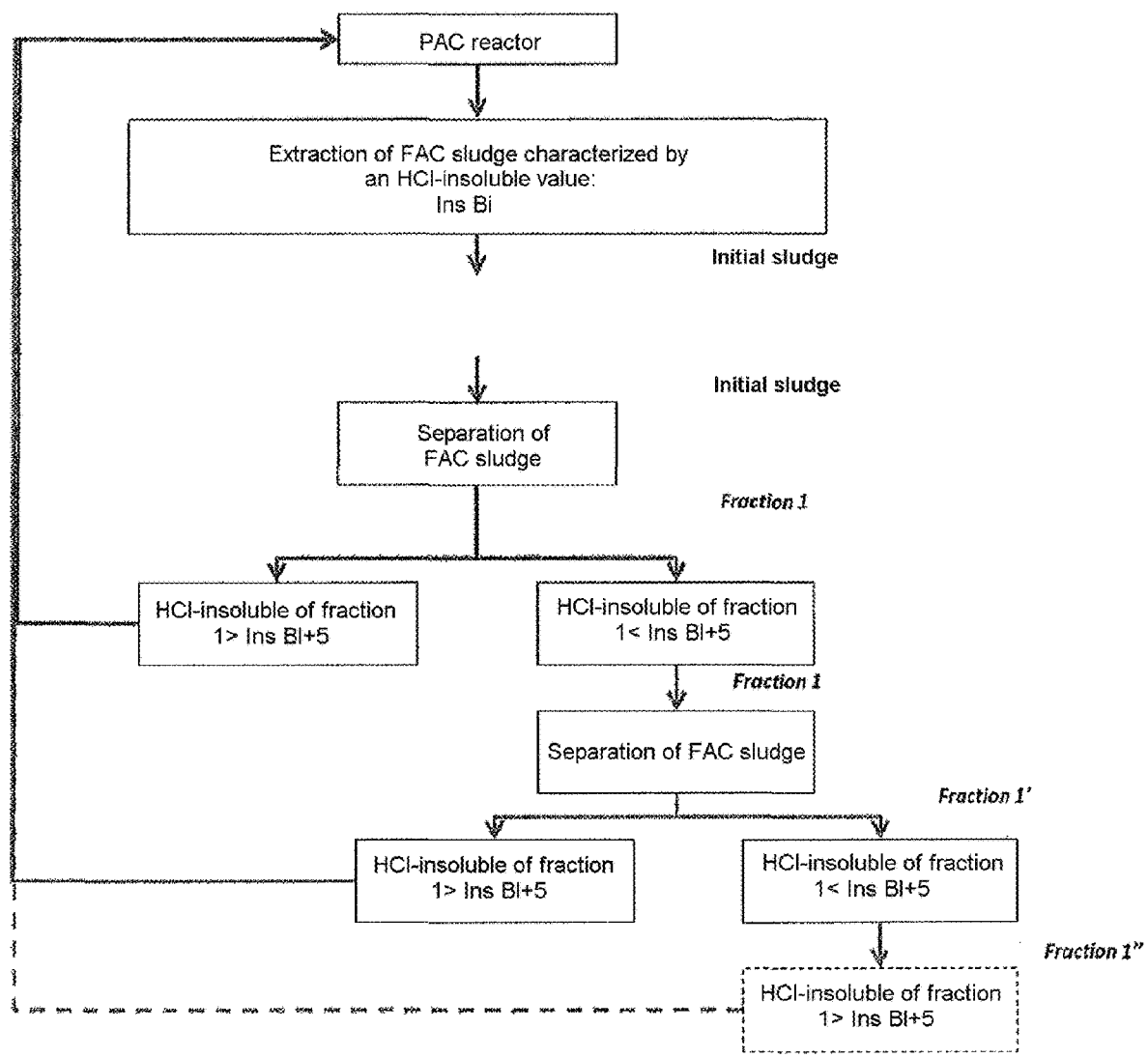
FIG. 3 schematically illustrates a method using several separation steps.

If, after the first separation step, the HCl-insoluble value of one of the fractions obtained is found to be insufficient, this fraction can itself be separated to produce two new fractions. When a fraction having an HCl-insoluble value higher by at least 5 percentage points than that of the sludge before separation is obtained, this fraction is then re-injected into the fluidized bed of powdered activated carbon. If none of the fractions obtained has a satisfactory HCl percentage they can again be separated. FIG. 3 illustrates a method applying several separation steps.

The separation step or separation steps are typically conducted in a hydrocyclone or several hydrocyclones. Hydrocyclones are devices for the separation of particles via centrifugal hydraulic classification. They are typically constituted of a cylindrical-conical chamber in which tangential feeding places the water in rotation before it exits the device via an axial overflow outlet. In the present invention, the hydrocyclone is used to increase the activated carbon portion contained in the SS of FAC sludge.

The successive separation steps can be carried out using a plurality of hydrocyclones installed in series. The number of hydrocyclones installed in series is dependent on the HCl-insoluble percentage at each step. This assembly of one or more hydrocyclones advantageously allows the production of at least one fraction characterized by an HCl-insoluble value:

- higher than 75% in an aqueous fluid treatment installation, via fluidized contact with coagulated activated carbon, having a single reactor for contacting of the water to be treated with the fluidized bed of coagulated activated carbon and separation therefrom;
- higher than 55% in an aqueous fluid treatment installation, via fluidized contact with coagulated activated carbon, having several reactors.

The separation step(s) can be performed continuously or periodically.

The present invention also concerns an aqueous fluid treatment installation comprising:
- (a) an aqueous fluid treatment device based on powdered activated carbon, advantageously coagulated and optionally flocculated, ensuring the contacting of the aqueous fluid with a fluidized bed of powdered activated carbon, advantageously coagulated and optionally flocculated, and separation of the aqueous fluid from the bed of powdered activated carbon that is advantageously coagulated and optionally flocculated;
- (b) means to extract a fraction of the fluidized bed of activated carbon, in the form of a sludge;
- (c) means to convey the sludge from the extraction point to the sludge separation device;
- (d) at least one sludge separation device;
- (e) means to convey the separated sludge to the aqueous fluid treatment device.

The activated carbon device of the installation for aqueous fluid treatment may be a treatment reactor with powdered activated carbon having up-flow operation such as described for example in FR2946333 or in French patent application N° 1354387 filed on 16 May 2013.

The means to extract the sludge of carbon flocs may be extraction circuits, preferably arranged in the lower part of the reactor reaction zone. The extraction of the activated carbon can be obtained by pumping or drawing-off under gravity via an extraction pipe (5) leading into the carbon bed. The extraction of the activated carbon can also be obtained by means of a concentrator collecting the flocs of powdered activated carbon from an overflow in the upper part of the reaction zone. Both systems to extract powdered activated carbon can be combined.

The sludge of activated carbon can be conveyed directly towards the sludge separation device by means of a pumping system, or it can be directed towards a buffer tank, able to be placed under agitation, to allow the storing of a certain volume of sludge before separation. In FIG. 1 the treatment installation comprises a buffer tank.

With the pumping system, the sludge can be fed into the separation device typically at a minimum pressure greater than or equal to 1.8 bars.

The separation device is typically a hydrocyclone. The phase with the least PAC concentration in the hydrocyclone, i.e. having the lowest HCl-insoluble value, is returned to the sludge evacuation circuit. The phase with the highest PAC concentration is advantageously returned to the bottom of the FAC reactor by means of a pipe or channel which is generally immersed in the reactor down to 1 meter above the floor. The hydrocyclone unit is preferably placed above the reactor so that the sludge can be injected under gravity. Otherwise it can be conveyed from a storage/injection unit via a set of pumps.

The hydrocyclone can be associated with a second carbon pumping assembly and with another hydrocyclone to treat the overflow of the first stage.

When the aqueous fluid treatment installation via fluidized contact with coagulated activated carbon comprises a single reactor for contacting and separation of the water to be treated from the fluidized bed of coagulated activated carbon, the fraction produced having the highest HCl-insoluble value can be added back to the reactor either under gravity or by means of a pumping system within the carbon bed of the reactor, preferably in the lower part of the reactor.

When the aqueous fluid treatment installation via fluidized contact with coagulated activated carbon comprises several reactors, the fraction produced having the highest HCl-insoluble value can be added back to one of the reactors (contacting reactor or separating reactor) either under gravity or by means of a pumping system within the carbon bed of the reactor, preferably in the lower part of the reactor.

If this fraction is fed back into the reactor(s) by means of a pumping system, an intermediate tank can be added.

The other fractions can be partly or fully conveyed to upstream of the installation to treat aqueous fluid via fluidized contact with coagulated activated carbon, if this is preceded by at least one clarification step of the aqueous fluid to be treated. These fractions can be fully or partly evacuated towards the relevant waste treatment processing channel.

EXAMPLES

Determination of HCl-Insoluble Value

The HCl-insoluble value is determined by acid attack, at constant boiling for 20 minutes, of a sample of carbon sludge taken from the bed of powdered activated carbon and previously oven dried at 105° C. After 20 minutes, the suspension is filtered through a glass fiber filter of Whatman GFC type. The filter and its content are then oven dried at 105° C.

The HCl-insoluble value is the ratio between the dry weights of the sample residue after acid attack and the initial weight of the carbon sludge.

Determination of SS Concentration

Reagents:
Ultrapure water
Material:
Filtration kit (ground-glass flask, filter holder with vacuumed end, graduated container, aluminium clamp, vacuum pump, tubing)
GFC Whatman circular filter, Ø47 mm, porosity 0.45 µm
1 L graduated test tube (or smaller depending on volume to be filtered)
Precision balance
Desiccator
Tongs
Oven at 105° C.
Operating mode:
Preparation of Filter Papers:
Rinse the filter papers with Ultrapure water using the filtration kit,
Place the papers in the oven at 105° C.

SS Determination:

Remove the filters from the oven and leave to cool 30 min in the desiccator;

Weigh the filters one by one using a precision balance (use tongs to take hold of filters and aluminium dish for transfer);

Place one filter on the filter holder of the kit, then position the graduated container and secure with the aluminium clamp;

Connect the filter holder to the vacuum pump;

Switch on the pump;

Take a 1 Liter sample to be analyzed in a clean graduated test tube;

Pour the water gradually into the container until the test tube is empty;

Switch off vacuum pump, remove clamp and container;

Remove filter with the tongs and place it in the aluminium dish;

Place the dish in the oven at 105° C. for at least 12 hours;

Remove the dish and place in desiccator for 30 minutes;

Weigh the filter on a precision balance.

Expression of Results:

$$SS\ (in\ g/L) = (m_2 - m_1)/V$$

Where:

$m_1$ is the weight in g of the initial filter $m_2$ is the weight in g of the filter after filtration V is the volume in mL of the filtered sample Hydrocycloning of FAC Sludge Characteristics of the PAC Purifying Reactor:

Single reactor without lining (such as described in French patent application N° 1354387 filed on 16 May 2013) with injection of coagulated PAC and anionic polymer. PAC of micro-mesoporous type, of mean diameter 15 to 35 μm.

Hydrocycloning tests of said FAC sludge were conducted on a pilot scale using a 2-inch hydrocyclone by MOZLEY, with vortex finders and spigots of different sizes: 8 to 14 mm for the vortex finders, and 3.2 to 9.4 mm for the spigots.

Table 1 shows the results obtained with a vortex finder of size 14.3 and spigots of size 6.4 and 9.4. In both configurations, the sludge recovered in the underflow has a higher SS concentration than the initial sludge, and a higher PAC content in the SS, 93% HCl-insoluble on average in the underflow compared with 83% for the initial FAC sludge. On the other hand, contrary to the initial sludge, the carbon flocs of the sludge in the underflow do not settle: the flocs are disorganized.

Similar results given in Table 2 were obtained using a vortex finder of size 14 and spigots of size 3.2 to 9.4 mm.

The sludge recovered in the underflow of the hydrocyclone was added back, at a certain flow rate, to the lower part of the FAC purifying reactor: this reinjection of the underflow sludge did not induce any increase in the turbidity of the water leaving the purification reactor: the carbon flocs of the underflow sludge are therefore trapped by the FAC bed of the reactor.

TABLE 1

Test results of the first series conducted at 2 bars on 2-inch Mozley HC

| | Initial sludge | | Underflow sludge | | | Gain in PAC content |
| --- | --- | --- | --- | --- | --- | --- |
| Vortex finder | Spigot | SS g/L | PAC content in SS % | Ratio Flow rate$_{underflow}$/ Flow rate$_{initial}$ % | SS g/L | PAC content of SS % | PAC content (Underflow sludge-Initial sludge) % points |
| 14.3 | 6.4 | 5.1 | 83 | 9 | 26 | 94 | 11 |
| 14.3 | 9.4 | 5.6 | 83 | 22 | 20 | 92 | 9 |

TABLE 2

Test results of the second series conducted at 2 bars on 2-inch Mozley HC

| | Initial sludge | | Underflow sludge | | | Gain in PAC |
| --- | --- | --- | --- | --- | --- | --- |
| Vortex finder | Spigot | SS g/L | PAC content in SS % | Ratio Flow rate$_{underflow}$/ Flow rate$_{initial}$ % | SS g/L | PAC content in SS % | content PAC content % points |
| 14 | 4.5 | 14.4 | 83 | 4% | 119 | 93 | 10 |
| 14 | 3.2 | 14.4 | 83 | 3% | 352 | 95 | 12 |
| 14 | 6.4 | 14.4 | 83 | 14% | 80 | 94 | 11 |
| 14 | 8 | 21.0 | 80 | 16% | 68 | 89 | 9 |
| 14 | 9.4 | 21.0 | 80 | 27% | 50 | 88 | 8 |

Effect of Reinjection of Underflow Sludge on Management of the FAC Reactor

Tests were conducted on a pilot scale to evaluate and validate the advantage of using a hydrocyclone on the sludge of FAC reactors.

Test 1

The initial condition of the FAC bed was as follows:

FAC bed height of 2.9 meters;

heterogeneous SS concentration profile with SS values varying from 5.8 to 7.5 g/l;

PAC content of SS in the order of 84%.

The application of 4 hydrocycloning cycles (extraction of FAC volume+use of hydrocyclone+injection of sludge recovered in hydrocyclone underflow into the lower part of reactor) allowed:

a reduction in the height of the FAC bed from 2.9 m to 2.1 m;

concentration of the SS content in the FAC bed with values of between 7.7 and 8.2 g/l (excluding purge height);

an increase in the PAC content of SS in the reactor, of 84 to 87%;

the production of a fraction 1 having an HCl-insoluble percentage higher than 91%, i.e. 7 percentage points higher than the HCl-insoluble value of the initial treated sludge.

Throughout these tests, the CT value (=SS concentration (g/L)*water/sludge contact time (min)) remained at 130.

Hydrocyclone treatment of part of the sludge of a FAC reactor, by reinjecting the sludge obtained in the underflow, therefore allows a reduction in the height of the FAC bed.

Test 2

Comparison of the results of UV absorbance abatement at 254 nm obtained before the reinjection tests and during these tests, shows that:

before the tests, the CT values varied between 60 and 90;
during the tests, the CT values allowed operation with a CT value of between 80 and 140.

Figure 2:
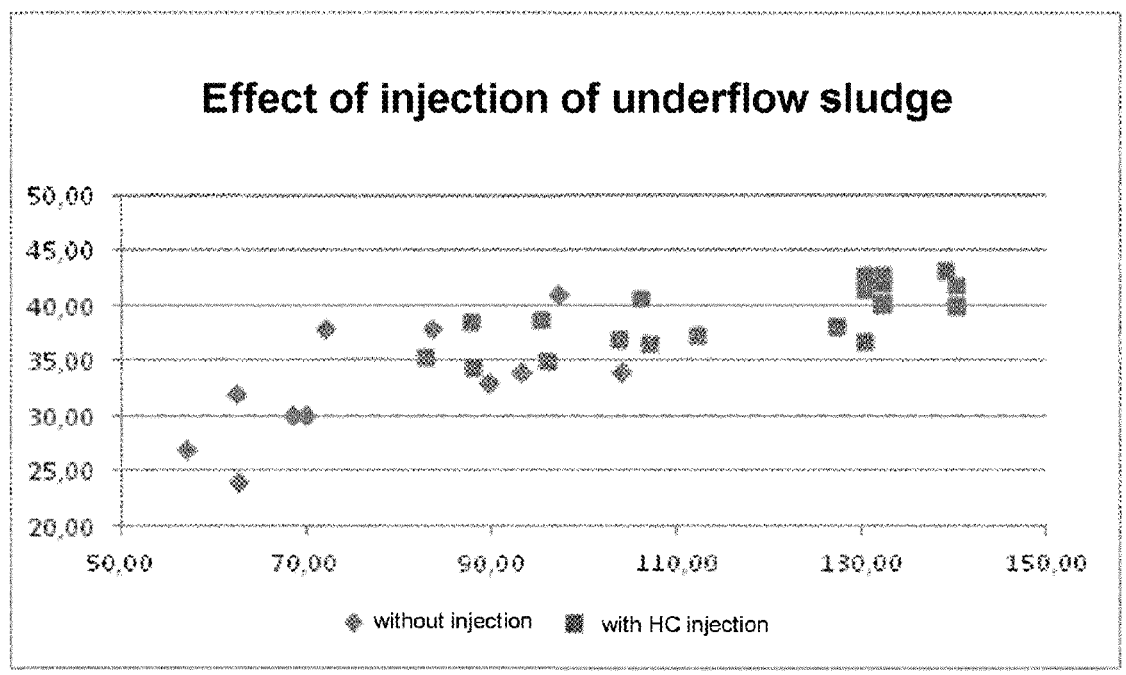
FIG. 2 illustrates changes in abatement of UV absorbance at 254 nm as a function of the CT value.

The increase in the CT value from 60 to 140 allowed an improvement in UV absorbance abatement at 254 nm from 25% to 44%, without exceeding a FAC bed height of 3 m (FIG. 2).

The invention claimed is:

1. A method for treating an aqueous fluid comprising the contacting of the aqueous fluid with a fluidized bed of powdered activated carbon, coagulated and optionally flocculated, and a gravitational separation of the aqueous fluid from the bed of coagulated powdered activated carbon that is optionally flocculated, said method for treating being characterized in that it comprises a management step of the fluidized bed of coagulated, powdered activated carbon, optionally flocculated, said management step comprising:
    (a) an extraction of a fraction of the fluidized bed of coagulated powdered activated carbon, optionally flocculated, in the form of sludge;
    (b) at least one separation of the sludge extracted at step (a) so as to obtain a first fraction and second fraction, the first fraction having an HCl-insoluble value higher by at least 5 percentage points than that of the sludge before separation;
    (c) a re-injection of the first fraction obtained at step (b) into the fluidized bed of coagulated powdered activated carbon, optionally flocculated, wherein the contacting of the aqueous fluid with the fluidized bed of powdered activated carbon, coagulated and optionally flocculated, and the separation of the aqueous fluid from the bed of coagulated powdered activated carbon that is optionally flocculated are conducted in a single treatment reactor with powdered activated carbon having up-flow operation, wherein the aqueous fluid containing powdered activated carbon and coagulating agent(s) is fed into the lower part of the treatment reactor, and wherein the first fraction is returned to the bottom of the reactor by means of a pipe or channel.

2. The method according to claim 1, wherein the first fraction obtained in step (b) has a concentration of suspended solids (SS) at least twice higher than the SS concentration of the sludge before separation.

3. The method according to claim 1, wherein the separation step (b) is carried out by means of at least one hydrocyclone.

4. The method according to claim 1, wherein the separation step (b) is performed continuously or periodically.

5. The method according to claim 1, wherein said first fraction has an HCl value higher by at least 10 percentage points than that of the sludge before separation.

6. The method according to claim 1, wherein a single separation is carried out in step (b) and the second fraction obtained has a SS concentration at least 1.5 times less than that of the fraction in the form of sludge extracted in step (a).

7. The method according to claim 6, wherein the second fraction is treated by clarification or flotation upstream of the treatment reactor or removed.

* * * * *